(12) United States Patent
Chang et al.

(10) Patent No.: US 12,248,164 B2
(45) Date of Patent: *Mar. 11, 2025

(54) DISPLAY DEVICE AND BACKLIGHT MODULE THEREOF

(71) Applicant: Radiant Opto-Electronics Corporation, Kaohsiung (TW)

(72) Inventors: Chia-Yin Chang, Kaohsiung (TW); Po-Chang Huang, Kaohsiung (TW); Kun-Cheng Lin, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/423,319

(22) Filed: Jan. 26, 2024

(65) Prior Publication Data

US 2024/0159953 A1 May 16, 2024

Related U.S. Application Data

(63) Continuation-in-part of application No. 18/189,234, filed on Mar. 24, 2023.

(30) Foreign Application Priority Data

Apr. 1, 2022 (CN) .......................... 202210336674.3

(51) Int. Cl.
*F21V 8/00* (2006.01)
(52) U.S. Cl.
CPC ......... *G02B 6/0053* (2013.01); *G02B 6/0051* (2013.01)

(58) Field of Classification Search
CPC ... G02B 6/0051; G02B 6/0073; G02B 5/0278
See application file for complete search history.

(56) References Cited

U.S. PATENT DOCUMENTS

| 5,966,192 A * | 10/1999 | Higuchi | G02B 6/0053 362/626 |
| 11,921,314 B2 * | 3/2024 | Chang | G02B 6/0053 |
| 2006/0103777 A1 * | 5/2006 | Ko | G02B 6/0053 349/65 |
| 2006/0210726 A1 * | 9/2006 | Jones | C08F 222/1025 428/1.31 |

(Continued)

OTHER PUBLICATIONS

Hu et al., WO 2013189103, Dec. 2013 (Year: 2013).*

*Primary Examiner* — Mary Ellen Bowman
(74) *Attorney, Agent, or Firm* — CKC & Partners Co., LLC

(57) ABSTRACT

A backlight module includes a light guide plate, a light source, and an optical film. The light guide plate has a light incident surface and a light exiting surface opposite to the light incident surface, in which the light exiting surface has a normal line. The light source is adjacent to the light incident surface. The optical film is disposed to the light exiting surface and includes plural parallel prisms and plural microstructures. An extending direction of each of the prisms is perpendicular to the normal line, and each of the prisms faces the light exiting surface of the light guide plate. Each of the microstructures is located on a surface of the optical film which faces away from the light guide plate. Each of the microstructures has a pyramid structure with plural facets. The prisms are located between the microstructures and the light exiting surface.

9 Claims, 19 Drawing Sheets

(56) References Cited

U.S. PATENT DOCUMENTS

| | | | | |
|---|---|---|---|---|
| 2009/0067178 A1* | 3/2009 | Huang | ................ | G02B 6/0065 |
| | | | | 219/121.85 |
| 2009/0244714 A1* | 10/2009 | Chang | ............... | G02F 1/133606 |
| | | | | 359/625 |
| 2009/0244737 A1* | 10/2009 | Chang | .................... | G02B 5/045 |
| | | | | 359/831 |
| 2011/0051047 A1* | 3/2011 | O'Neill | ................ | G02B 6/0096 |
| | | | | 349/67 |
| 2015/0293272 A1* | 10/2015 | Pham | .................. | G02B 5/0268 |
| | | | | 205/95 |
| 2019/0108786 A1* | 4/2019 | Lee | ....................... | G02B 5/0278 |
| 2023/0229040 A1* | 7/2023 | Park | .................... | G02B 6/0081 |
| | | | | 362/97.1 |

* cited by examiner

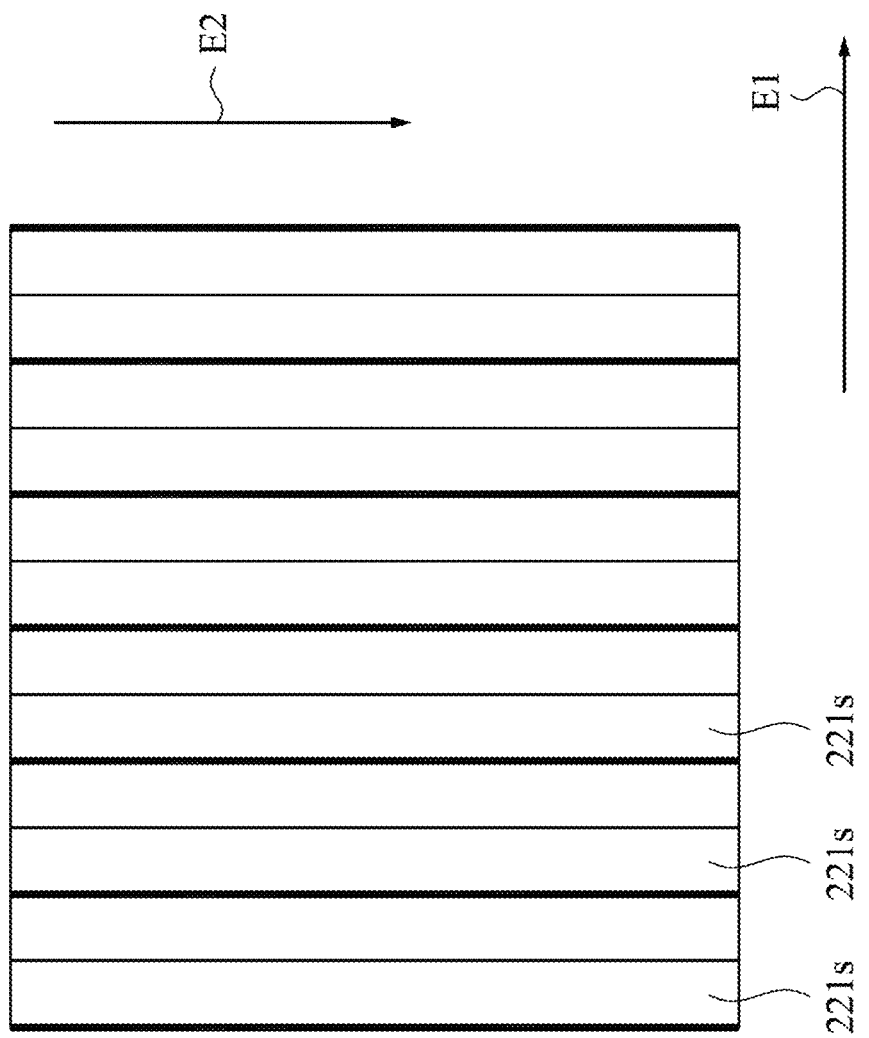

DISPLAY DEVICE AND BACKLIGHT MODULE THEREOF

RELATED APPLICATIONS

The present application is a continuation-in-part of U.S. application Ser. No. 18/189,234, filed Mar. 24, 2023, and this application also claims priority from China Application Serial Number 202210336674.3, filed Apr. 1, 2022. The entire contents of each of which are incorporated by reference.

BACKGROUND

Field of Invention

The present invention relates to a display device and a backlight module, and more particularly, to an edge type backlight module and a display device including the edge type backlight module.

Description of Related Art

The conventional backlight module usually has a diffusion sheet to uniformize light. Typically, the common diffusion sheet has plural scattering particles, and the scattering particles can scatter the light and emit from the diffusion sheet, thereby uniformizing the light. However, the diffusion sheet with the scattering particles is usually used to conceal flaws, and has low optical directivity to modify the high directivity of the light guide plate. To increase the directivity, the haze of the diffusion sheet must be reduced, resulting in poor a flaw-concealing effect. Although the brightness enhancement sheet is beneficial to the enhancement of luminance, the haze of the upper and lower diffusion sheets used in the backlight module will affect the luminance and the optical appearance, such that it is difficult to further increase the luminance of the conventional backlight module. Therefore, how to increase the concentration of light at a light-exiting viewing angle and the luminance at a normal viewing angle while maintaining the flaw-concealing ability has become the design focus of the backlight module.

SUMMARY

One embodiment of the present invention provides a backlight module, which includes an optical film that can enhance the light condensing performance at a light-exiting viewing angle and the luminance at the normal viewing angle.

Another embodiment of the present invention provides a display device, which includes the aforementioned backlight module.

A backlight module provided by one embodiment of the present invention includes a light guide plate, a light source, and an optical film. The light guide plate has a light incident surface and a light exiting surface opposite to the light incident surface, wherein the light exiting surface has a normal line. The light source is adjacent to the light incident surface. The optical film is disposed to the light exiting surface, and includes plural parallel prisms and plural microstructures. An extending direction of each of the prisms is perpendicular to the normal line, and each of the prisms faces the light exiting surface of the light guide plate. Each of the microstructures is located on a surface of the optical film which faces away from the light guide plate, wherein each of the microstructures has a pyramid structure with plural facets. The prisms are located between the microstructures and the light exiting surface.

In one embodiment of the present invention, the backlight module further includes plural prism sheets, wherein the optical film is located between the prism sheets and the light exiting surface.

In one embodiment of the present invention, each of the prism sheets includes plural parallel prism lenticulars, wherein an extending direction of the prism lenticulars of one of the prism sheets is perpendicular to an extending direction of the prism lenticulars of another one of the prism sheets.

In one embodiment of the present invention, the light exiting surface is connected to one side of the light incident surface. The light source has plural light-emitting diodes arranged along a straight line, an extending direction of the prism lenticulars of one of the prism sheets is parallel to the straight line, and an extending direction of the prism lenticulars of another one of the prism sheets is perpendicular to the straight line.

In one embodiment of the present invention, the extending direction of the prisms is perpendicular to the straight line.

In one embodiment of the present invention, the light exiting surface is connected to one side of the light incident surface, and the light source has plural light-emitting diodes arranged along a straight line, wherein an extending direction of the prism lenticulars of each of the prism sheets is neither parallel nor perpendicular to the straight line.

In one embodiment of the present invention, the extending direction of the prisms is parallel to the straight line.

In one embodiment of the present invention, the microstructures are plural pyramid concaves adjacent to each other.

In one embodiment of the present invention, the microstructures are pyramid bumps adjacent to each other.

In one embodiment of the present invention, the microstructures are arranged obliquely in an array relative to one side of the optical film.

In one embodiment of the present invention, the light guide plate has a bottom surface opposite to the light exiting surface and plural light guide structures formed on the bottom surface, wherein each of the light guide structures has a light facing surface and a non-light facing surface connected to each other. The light facing surface faces a light traveling direction of the light source, wherein a first included angle is formed between the light facing surface and the bottom surface, a second included angle is formed between the non-light facing surface and the bottom surface. Both the first included angle and the second included angle are acute angles, and the first included angle is smaller than the second included angle.

A display device provided by another embodiment of the present invention includes the aforementioned backlight module and a display panel, wherein the display panel is disposed to the backlight module.

According to the aforementioned description, with the prisms and the microstructures, the light emitted from the light source passes through the prisms of the optical film to enhance directivity, and then passes through the microstructures of the optical film to maintain flaw-concealing. Therefore, the optical film can concentrate or condense the exiting light while maintaining the flaw-concealing ability, thereby enhancing the light condensing performance at a light-exiting viewing angle and the luminance at a normal viewing angle of the backlight module.

BRIEF DESCRIPTION OF THE DRAWINGS

FIG. 2D and FIG. 2E are schematic top views of some of the prism sheets in FIG. 2B.

DETAILED DESCRIPTION

Figure 1A:
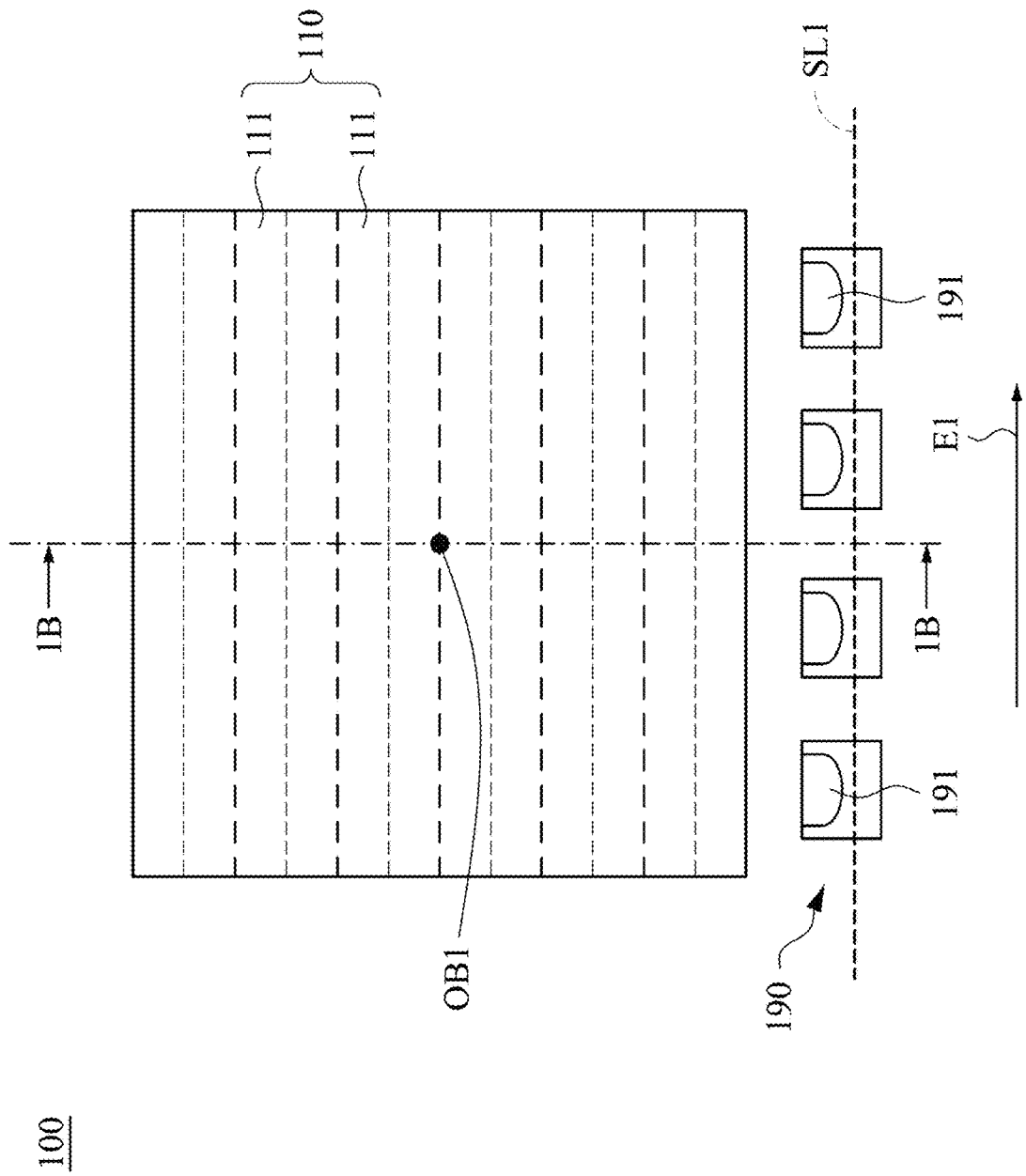
FIG. 1A is a schematic top view of a backlight module in accordance with one embodiment of the present invention.

In the following text, in order to clearly present the technical features of present application, dimensions (such as lengths, widths, thicknesses, and depths) of elements (such as layers, films, substrates, and regions) in the drawings will be enlarged in a non-proportional manner, and the numbers of some of the elements will be decreased. Therefore, the description and the explanation of the following embodiments are not limited to the numbers, the sizes, and the shapes of the elements in the drawings, but should cover deviations in size, shape, and both as a result of actual manufacturing and/or tolerances. For example, planar surfaces shown in the drawings may have rough and/or non-linear features, and corners shown in the drawings may be rounded. Therefore, the elements presented in the drawings of the present application are mainly for illustration, and are not intended to accurately depict the actual shapes of the elements and limit the scope of the claims of the present application.

In addition, terms such as "about", "approximately", or "substantially" in the present application cover not only the explicitly recited values and value ranges, but also the permissible deviation ranges understood by any person having ordinary skill in the art, wherein the deviation ranges may be determined by the error generated during the measurement, and the errors may be caused by the limitations of the measurement system, the process conditions, or both, for example. Furthermore, the term "about" may mean within one or more standard deviations of the above values, such as within ±30%, ±20%, ±10%, or ±5%. The acceptable deviation ranges or the standard deviations for the terms such as "about", "approximately", or "substantially" appearing herein can be chosen according to optical properties, etching properties, mechanical properties, or other properties.

Figure 1B:
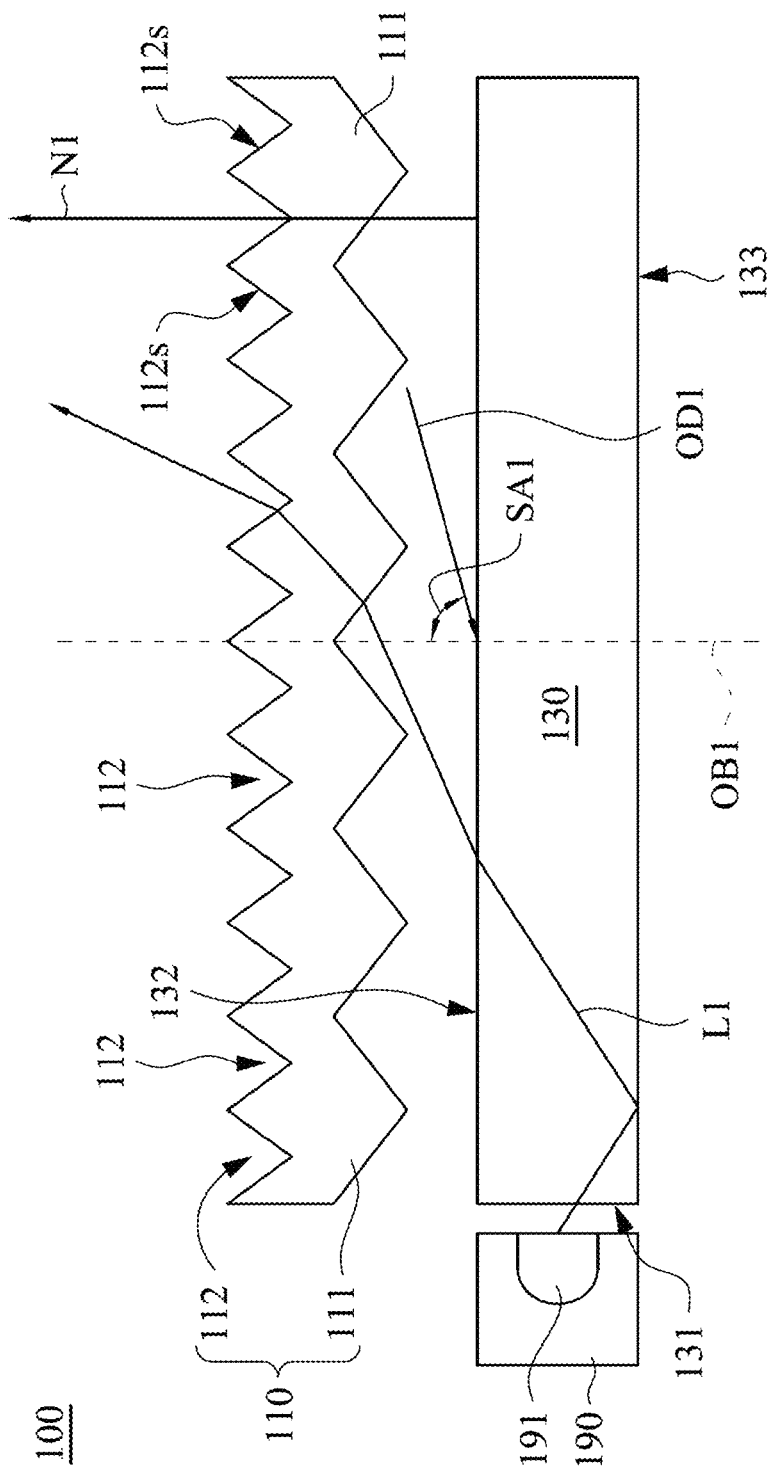
FIG. 1B is a schematic cross-sectional view taken along a line 1B-1B in FIG. 1A.

FIG. 1A is a schematic top view of a backlight module in accordance with one embodiment of the present invention, and FIG. 1B is a schematic cross-sectional view taken along a line 1B-1B in FIG. 1A. Referring to FIG. 1A and FIG. 1B, a backlight module 100 includes an optical film 110, a light guide plate 130, and a light source 190. The light guide plate 130 has a light incident surface 131 and a light exiting surface 132, which is opposite to the light incident surface 131, wherein the light exiting surface 132 has a normal line N1 and may be connected to one side of the light incident surface 131. The light source 190 is adjacent to the light incident surface 131, and can emit light L1 toward the light incident surface 131. The optical film 110 is disposed to the light exiting surface 132, and includes plural prisms 111 and plural microstructures 112.

An extending direction E1 of each of the prisms 111 is perpendicular to the normal line N1, and each of the prisms 111 faces the light exiting surface 132 of the light guide plate 130. Each of the microstructures 112 is located on a surface of the optical film 110 which faces away from the light guide plate 130, wherein each of the microstructures 112 is a pyramid structure with plural facets 112s, and the prisms 111 are located between the microstructures 112 and the light exiting surface 132. In addition, FIG. 1A omits the microstructures 112 to clearly show the orientation of the prisms 111, wherein in FIG. 1A, the thick dashed lines represent valleys between any adjacent two of the prisms 111, and the thin dashed lines represent peaks of each of the prisms 111.

The light guide plate 130 may further have a bottom surface 133, wherein the light exiting surface 132 and the bottom surface 133 are opposite to each other, and the bottom surface 133 and the light exiting surface 132 may be two opposite surfaces of the light guide plate 130, as shown in FIG. 1B. When the light source 190 emits the light L1 toward the light incident surface 131, the light L1 enters the light guide plate 130 from the light incident surface 131, wherein some of the light L1 propagates in the light guide plate 130 from the light incident surface 131 to the bottom surface 133. The bottom surface 133 can reflect a portion of the light L1. For example, the bottom surface 133 may continuously reflect the light in the light guide plate 130 through total internal reflection (TIR) to transmit the light to the rear of the light guide plate 130. The other portion of the light L1 may change its reflection angle when reflected by the microstructures arranged on the bottom surface 133 because the rule of total internal reflection (TIR) has been breached, thereby leaving the light guide plate 130 from the light exiting surface 132, and entering the prisms 111 of the optical film 110. Firstly, the prisms 111 are used to deflect the light L1 toward the normal line N1 to reduce the exit angle of the light L1 when passing through the prisms 111, thereby concentrating or condensing the emitting of the light L1, which is emitted from the light source, so as to enhance the directivity. On the contrary, if the microstructures 112 with the plural facets 112s of the present invention are designed on the surface which faces the light guide plate 130, the traveling direction of the light L1 will be changed to deviate from the normal line N1, such that the light L1 exiting from the microstructures 112 has a relatively large angle with the normal line N1, and the light L1 cannot be emitted concentratedly resulting in worse directivity.

Next, the light L1 enters the optical film 110 through the prisms 111 and leaves the optical film 110 through the microstructures 112 to maintain the flaw-concealing effect. The flaw-concealing effect mainly results from that each microstructure 112 has plural facets 112s, which can deflect the light L1 and guide the light L1 to various light emitting directions, such that it can prevent light energy from being too concentrated directly above the microstructures 112, thereby maintaining the flaw-concealing effect. In contrast, the typical dot microstructures or diffusing particles located on the surface faced away from the light guide plate 130 will scatter the light in an uncertain direction, such that the flaw-concealing direction cannot be effectively controlled. Furthermore, if the optical film is designed without microstructures on the surface faced away from the light guide plate, no microstructures can be used to provide the flaw-concealing effect and flaw-concealing direction after the directivity being enhanced due to the concentrated emission when passing through the prisms 111 of the optical film 110, which is not beneficial to the overall luminescence uniformity.

During the light L1 passes through the light guide plate 130 and the optical film 110 in sequence and leaves the backlight module 100, the prisms 111 and the microstructures 112 can refract the light L1, such that an exit angle of the light L1 on the light guide plate 130 is not equal to an exit angle of the light L1 on the optical film 110. In addition, the optical film 110 can also deflect and emit the light L1 towards the normal N1, so as to enhance the light condensing performance at a light-exiting viewing angle and the luminance at a normal viewing angle of the backlight module.

The backlight module in the prior art adopts the configuration composed of two diffusion sheets and two prism sheets, wherein a light-exiting viewing angle has a deflection of about 60 degrees relative to a normal direction of the light exiting surface 132 of the light guide plate 130, such that the backlight module lacks directivity, and the overall light exiting energy is not limited to a specific angle, resulting in a poor peep-proof effect. When the optical film 110 is used to replace the lower diffusion sheet in the prior art, the directivity is increased, the overall light exiting energy is more concentrated and more deflected to the normal direction of the light exiting surface 132 of the light guide plate 130, and the light-exiting viewing angle is ranging from about 40 degrees to 50 degrees.

That is, the optical film 110 has high directivity while maintaining the flaw-concealing effect, such that the luminance at the normal viewing angle can be further enhanced to save energy, increase endurance, and meet the future trend of increasing luminance.

Furthermore, the light source 190 has plural light-emitting diodes 191 arranged along a straight line SL1. Specifically, the light-emitting diodes 191 may be disposed on a strip circuit substrate, such that the light-emitting diodes 191 may be arranged in a straight line, i.e., arranged along the straight line SL1, wherein the light-emitting diodes 191 and the circuit substrate may be integrated into a light bar, and the circuit substrate may be a printed circuit board (PCB) or a flexible printed circuit (FPC) board. In addition, the extending direction E1 of the prisms 111 of the optical film 110 may be parallel to the straight line SL1, as shown in FIG. 1A.

Figure 1C:
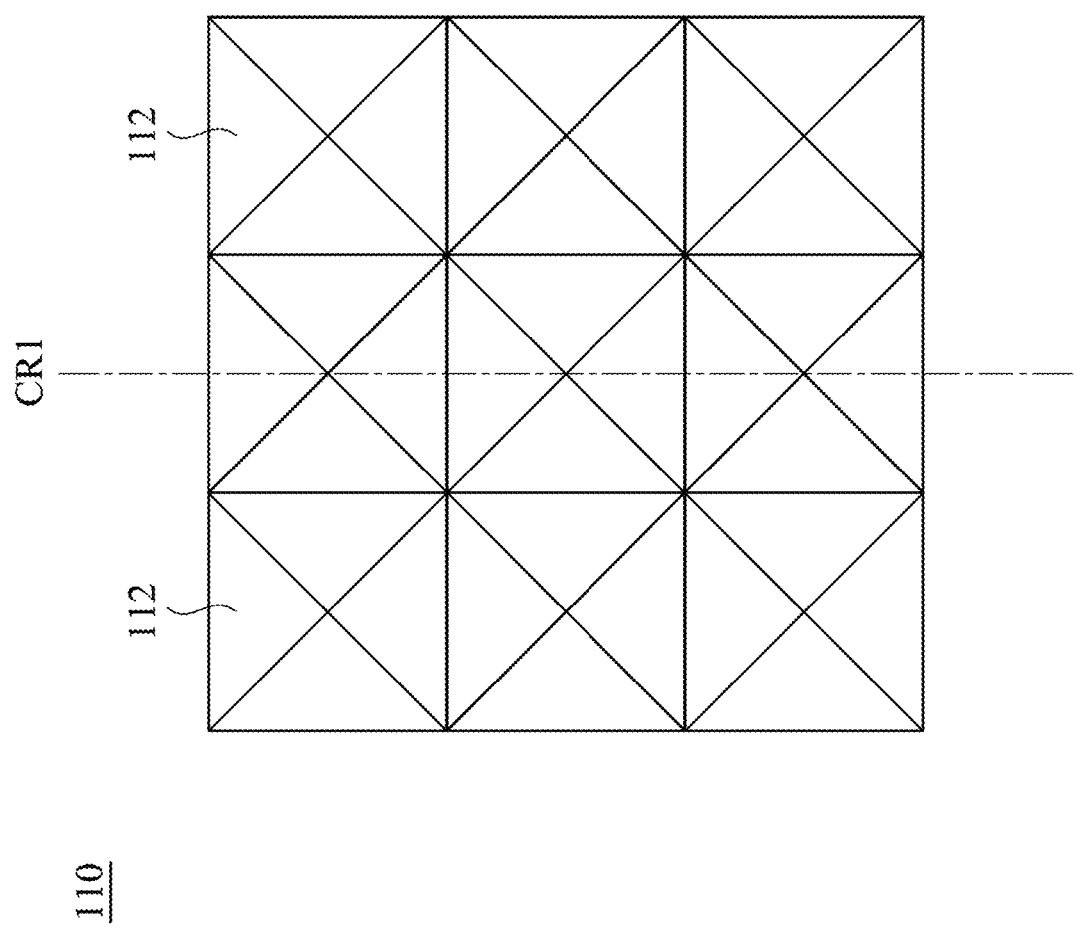
FIG. 1C is a schematic partial top view of the optical film in FIG. 1B.
Figure 1D:
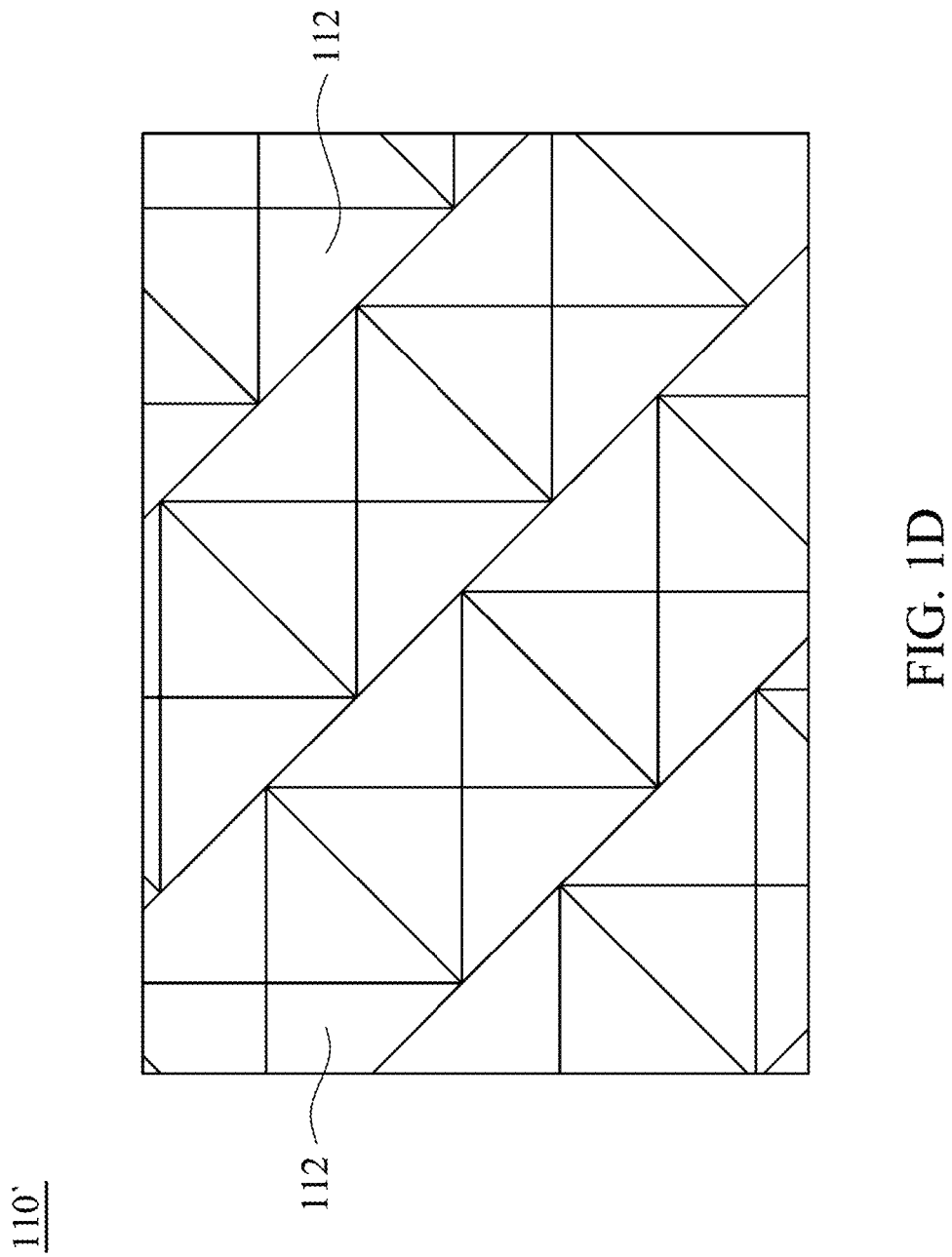
FIG. 1D is a schematic partial top view of an optical film in accordance with another embodiment of the present invention.

FIG. 1C is a schematic partial top view of the optical film in FIG. 1B, wherein the optical film 110 shown in FIG. 1B can be taken along a cross-sectional line CR1 in FIG. 1C. Referring to FIG. 1B and FIG. 1C, the microstructures 112 may be plural pyramid concaves adjacent to each other, and the facets 112s may be sidewalls of the pyramid concaves. For example, each of the microstructures 112 may be a quadrangular pyramid concave, so each of the microstructures 112 may have four facets 112s (i.e., sidewalls), wherein an angle between the opposite two of the facets 112s may be about 90 degrees. Therefore, each of the microstructures 112 may be a regular quadrangular pyramid that is symmetrical in both the X-axis and the Y-axis. Alternatively, each of the microstructures 112 may be an asymmetrical pyramid that is symmetrical in one of the X-axis and the Y-axis and is asymmetrical in the other one of the X-axis and the Y-axis, to cause different degrees of light deflection in different directions, so as to effectively control the flaw-concealing effects in the different directions. Furthermore, in the other embodiments, the microstructures 112 may be plural pyramid bumps adjacent to each other, and a shape of the pyramid bumps may be quadrangular pyramid, and the facets 112s may be side surfaces of the pyramid bumps. Therefore, the microstructures 112 may be bumps or concaves, and FIG. 1B and FIG. 1C are only for illustration not to limit the present invention. In FIG. 1B and FIG. 1C, the microstructures 112 are arranged in a matrix along one side of the optical film 110, while in other embodiments shown in FIG. 1D, the microstructures 112 of the optical film 110' in FIG. 1D may also be arranged obliquely in an array relative to one side of the optical film 110'.

Figure 2A:
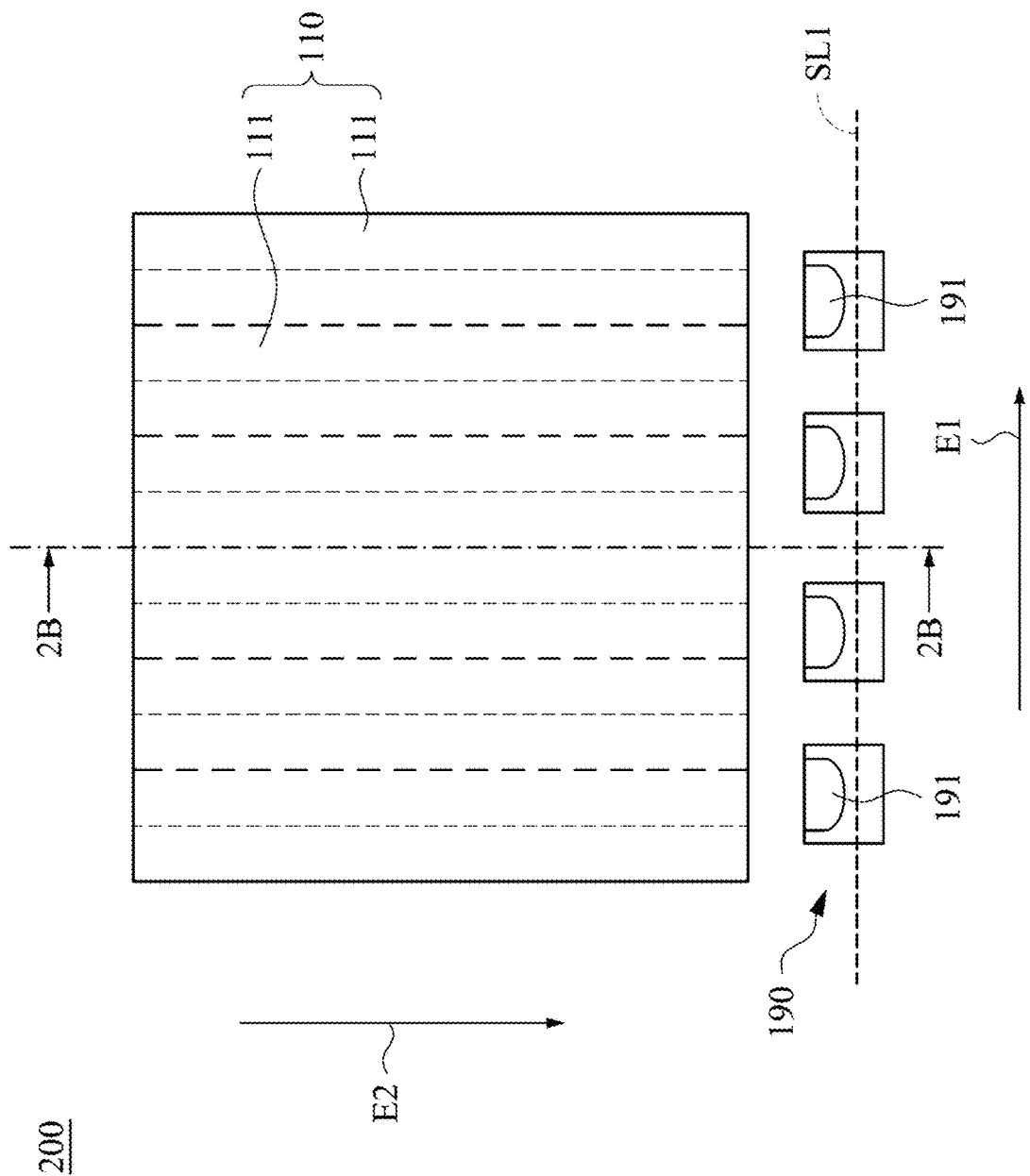
FIG. 2A is the schematic top view of a backlight module in accordance with another embodiment of the present invention.
Figure 2B:
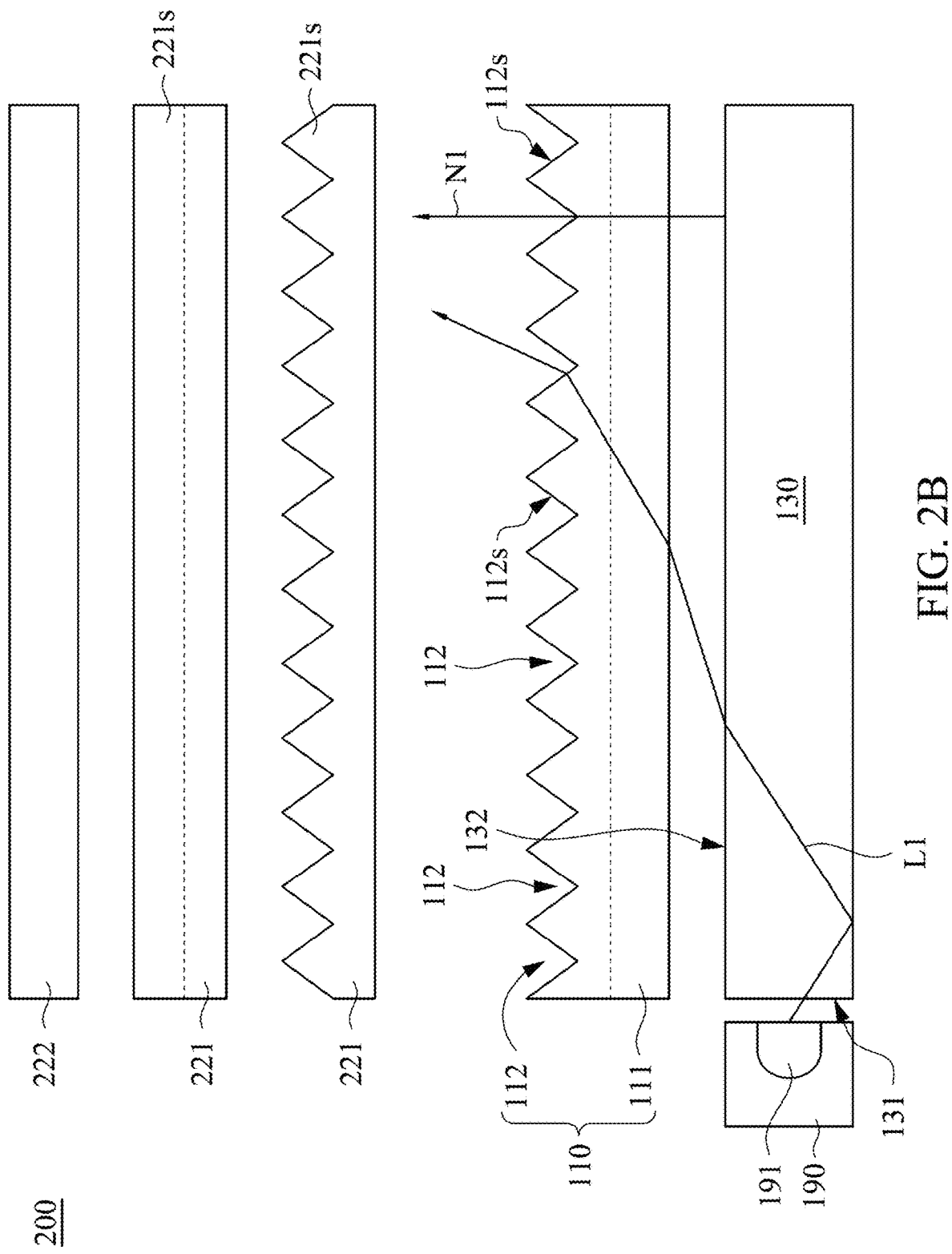
FIG. 2B is a schematic cross-sectional view taken along a line 2B-2B in FIG. 2A.

FIG. 2A is the schematic top view of a backlight module in accordance with another embodiment of the present invention, and FIG. 2B is a schematic cross-sectional view taken along a line 2B-2B in FIG. 2A. Referring to FIG. 2A and FIG. 2B, a backlight module 200 of the present embodiment is similar to the backlight module 100 of the previous embodiment. For example, the backlight module 200 also includes an optical film 110, a light guide plate 130, and a light source 190. The following mainly describes the differences between backlight modules 100 and 200. The similarities between the backlight modules 200 and 100 are basically not repeated here.

In the present embodiment, the light-emitting diodes 191 of the light source 190 are also arranged along the straight line SL1. However, it is different from the foregoing embodiment in that the prisms 111 of the optical film 110 of the backlight module 200 extend along an extending direction E2, wherein the extending direction E2 is perpendicular to the straight line SL1, as shown in FIG. 2A. The extending direction E1 may be parallel to the straight line SL1, such that the extending direction E1 may be perpendicular to the extending direction E2.

Figure 2C:
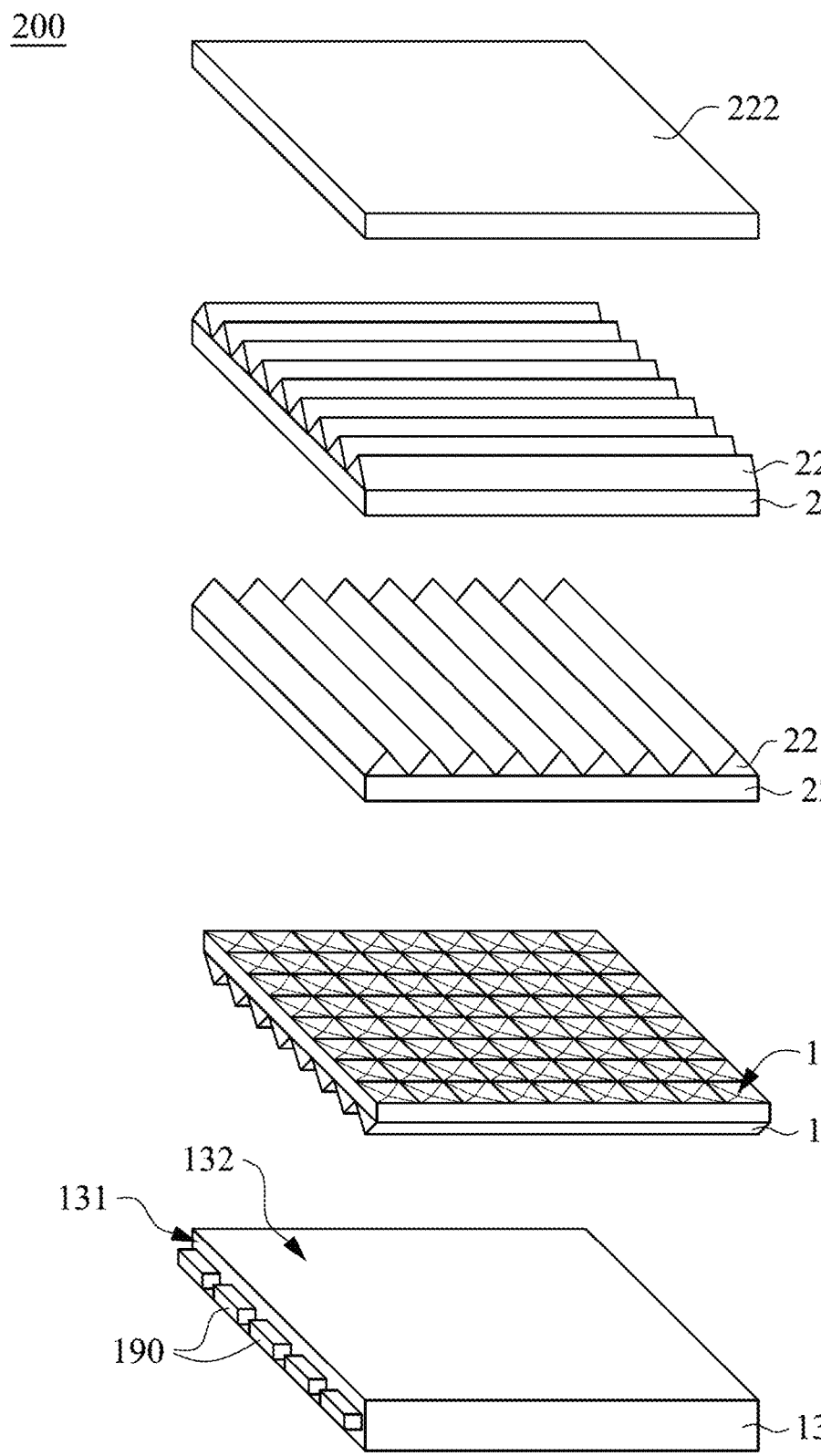
FIG. 2C is a three-dimensional schematic diagram of the backlight module of FIG. 2B.

FIG. 2C is a three-dimensional schematic diagram of the backlight module of FIG. 2B. Referring to FIG. 2B and FIG. 2C, the backlight module 200 further includes plural prism sheets 221 and a diffusion sheet 222, wherein the optical film 110 is located between the prism sheets 221 as well as the diffusion sheet 222 and the light exiting surface 132 of the light guide plate 130. In the embodiment shown in FIG. 2B, the prism sheets 221 are located between the diffusion sheet 222 and the optical film 110. In addition, FIG. 2A omits the prism sheets 221, the diffusion sheet 222, and the microstructures 112 to clearly show the extending direction E2 of the prisms 111 of the optical film 110.

Figure 2E:
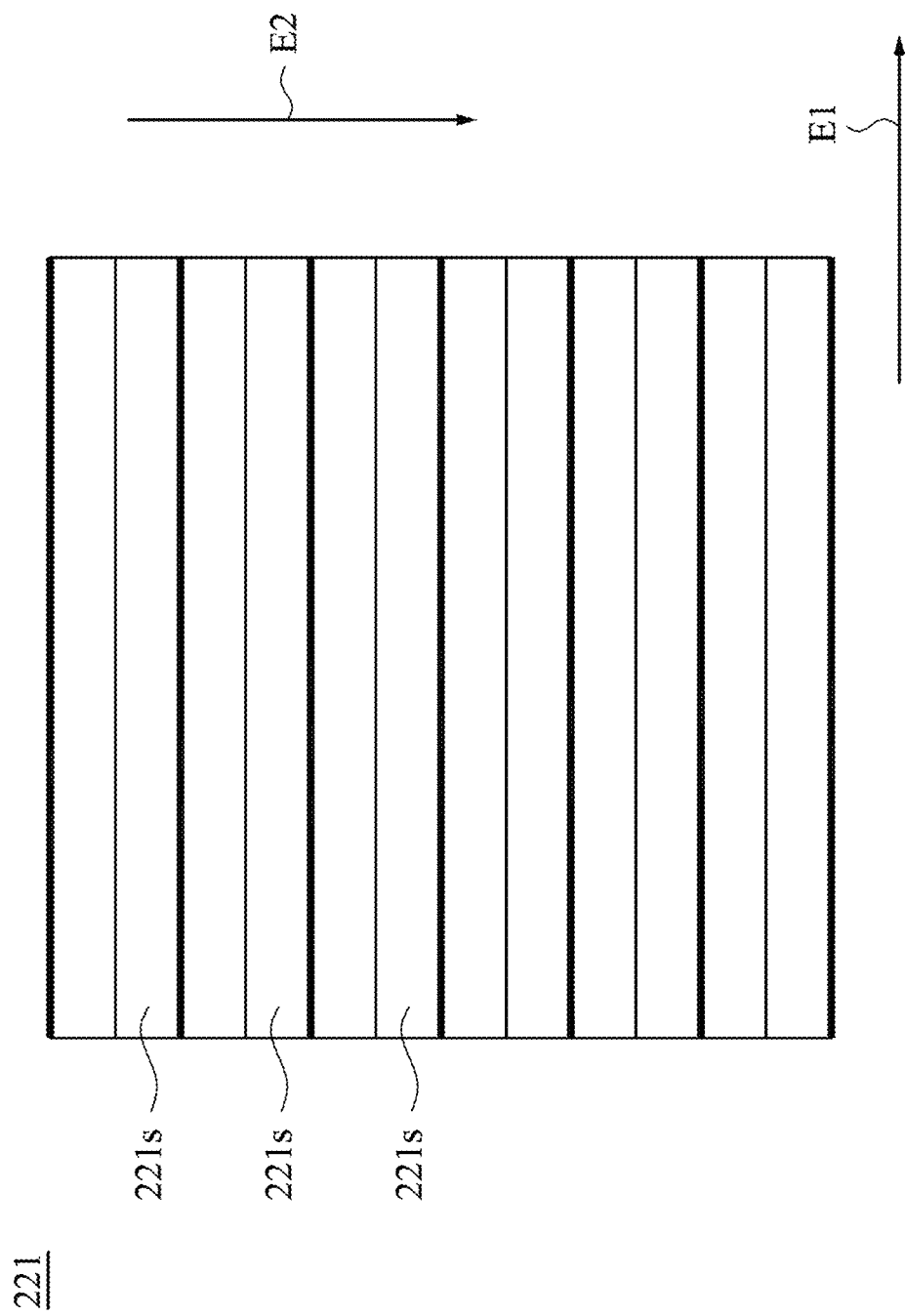

FIG. 2D and FIG. 2E are schematic top views of some of the prism sheets (i.e., the prism sheets 211) in FIG. 2B, wherein the prism sheet 221 shown in FIG. 2D is the lower prism sheet 221 in FIG. 2B, and the prism sheet 221 shown in FIG. 2E is the upper prism sheet 221 in FIG. 2B. Referring to FIG. 2B through FIG. 2E, each prism sheet 221 (i.e., the prism sheet) includes plural parallel prism lenticulars 221s. In FIG. 2D and FIG. 2E, a thick line represents a valley between adjacent two of the prism lenticulars 221s, and a thin line represents a peak of each prism lenticular 221s.

An extending direction of the prism lenticulars 221s of one of the prism sheets 221 is perpendicular to an extending direction of the prism lenticulars 221s of the other one of the prism sheets 221, such that the prism sheets 221 can guide most of the light L1 to emit along a direction parallel to the normal N1. In the embodiment shown in FIG. 2D and FIG. 2E, the prism lenticulars 221s of the upper prism sheet 221 extend along the extending direction E2 (as shown in FIG. 2D), the prism lenticulars 221s of the lower prism sheet 221 extend along the extending direction E1 (as shown in FIG. 2E), such that the extending direction E2 of the prism lenticulars 221s of the upper prism sheet 221 is perpendicular to the extending direction E1 of the prism lenticulars 221s of the lower prism sheet 221.

The extending direction E1 is parallel to the straight line SL1, and the extending direction E2 is perpendicular to the straight line SL1, such that the extending direction E1 of the prism lenticulars 221s of the lower prism sheet 221 is parallel to the straight line SL1, and the extending direction E2 of the prism lenticulars 221s of the upper prism sheet 221 is perpendicular to the straight line SL1. Therefore, in the present embodiment, the extending direction E1 of the prism lenticulars 221s of one of the prism sheets (such as the lower prism sheet 221) is parallel to the straight line SL1, and the extending direction E2 of the prism lenticulars 221s of the other one of the prism sheets (such as the upper prism sheet 221) is perpendicular to the straight line SL1. It is noteworthy that in the embodiment shown in FIG. 2D and FIG. 2E, the extending directions E1 and E2 of the prism lenticulars 221s of the two prism sheets 221 are parallel to and perpendicular to the straight line SL1 respectively. However, in other embodiments, the extending direction of the prism lenticulars 221s of each of the prism sheets 221 may be neither parallel nor perpendicular to the straight line SL1.

Figure 3A:
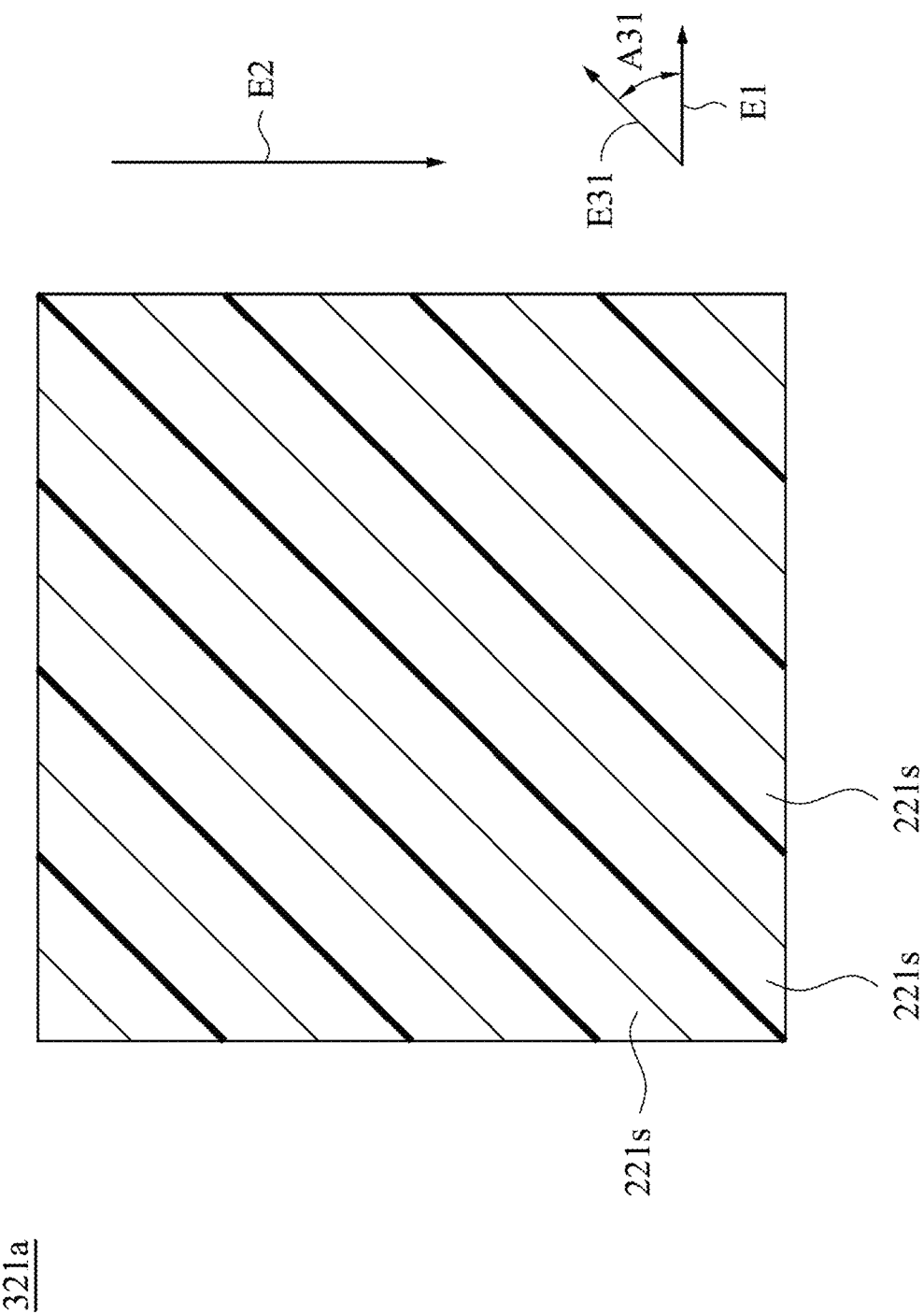
FIG. 3A and FIG. 3B are schematic top views of plural prism sheets in accordance with another embodiment of the present invention.
Figure 3B:
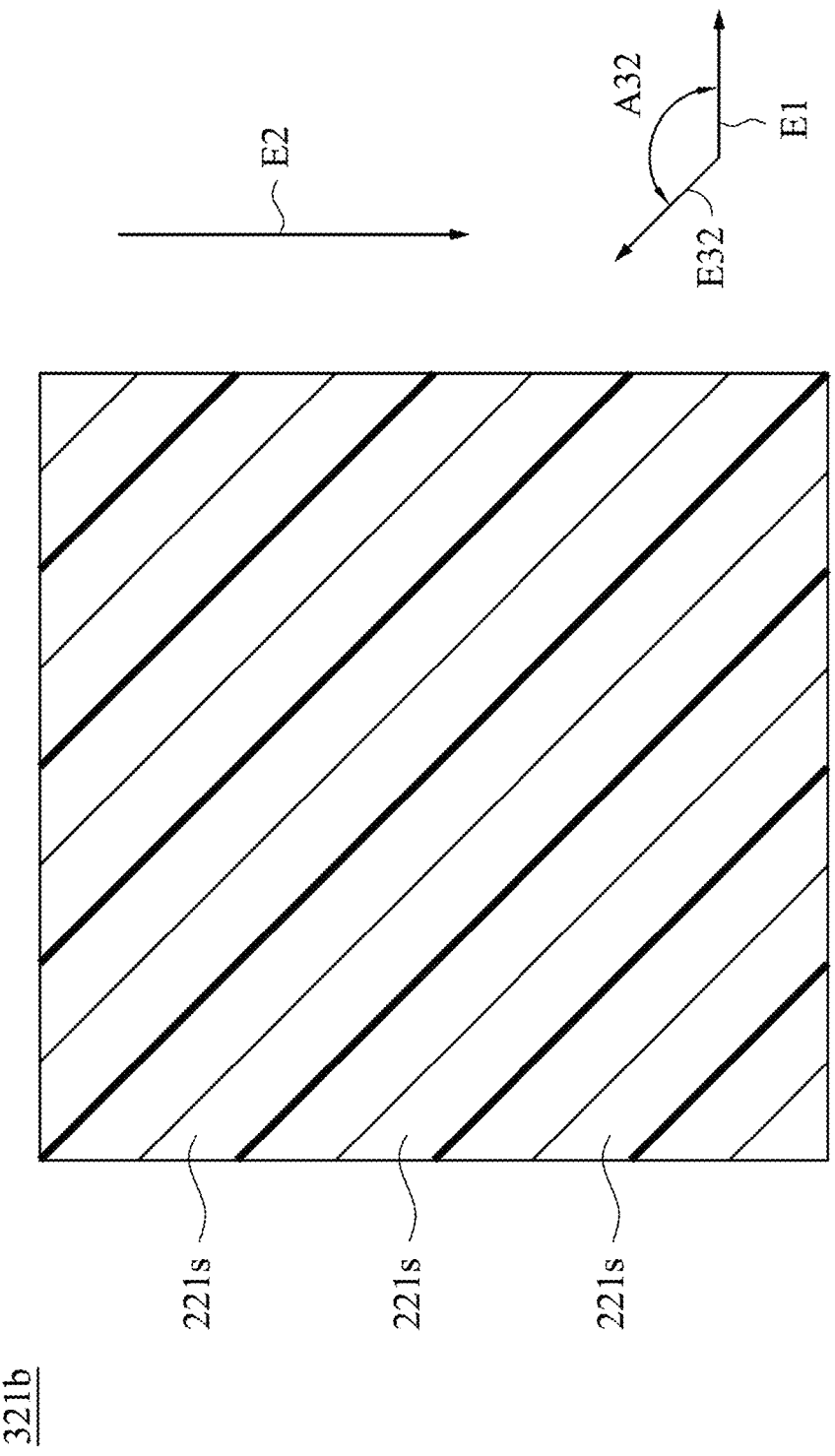

Refer to FIG. 3A and FIG. 3B. Prism sheets 321a and 321b shown in FIG. 3A and FIG. 3B are similar to the prism sheets 221, and both include plural parallel prism lenticulars 221s. The only difference from the prism sheets 221 is that extending directions of the prism lenticulars 221s of the prism sheets 321a and 321b are different from those of the prism sheets 221.

Specifically, the prism sheets 321a and 321b shown in FIG. 3A and FIG. 3B can be applied to the backlight module 200 in FIG. 2B. For example, the prism sheet 321a shown in FIG. 3A may replace the upper prism sheet 221 in FIG. 2B, and the prism sheet 321b shown in FIG. 3B may replace the lower prism sheet 221 in FIG. 2B.

In the above configuration, under using the optical film 110 to provide high directivity and maintain the flaw-concealing effect, and the arrangement direction of the light-emitting diodes 191 of the light source 190 being parallel to the extending direction of the prisms 111 of the optical film 110, the extending direction of the prism lenticulars of each of the prism sheets is correspondingly designed to be neither parallel nor perpendicular to the arrangement direction of the light-emitting diodes 191 of the light source 190. The extending direction of the prism lenticulars 221s of each of the prism sheets 221 shown in FIG. 3A and FIG. 3B is neither parallel nor perpendicular to the straight line SL1 (equivalent to the extending direction E1 shown in FIG. 3A and FIG. 3B). For example, the prism sheet 321a shown in FIG. 3A extends along an extending direction E31, and the prism sheet 321b shown in FIG. 3B extends along an extending direction E32, wherein the extending directions E31 and E32 are neither parallel nor perpendicular to the extending direction E1, and the extending directions E31 and E32 are perpendicular to each other.

For example, an included angle A31 between the extending directions E31 and E1 in FIG. 3A may be about 45 degrees, and an included angle A32 between the extending directions E32 and E1 in FIG. 3B may be about 135 degrees. Thus, the extending directions E31 and E32 are neither parallel nor perpendicular to the extending direction E1, an included angle between the extending directions E31 and E32 may be about 90 degrees, that is, the extending directions E31 and E32 are perpendicular to each other. Accordingly, the direction of the light-exiting viewing angle can be further adjusted to the perpendicular direction of the light exiting surface 132 of the light guide plate 130, such that the light-exiting viewing angle is about 0 degree, the luminance can be further increased, and the full width at half maximum (FWHM) of the light exiting energy can be further concentrated, thereby improving the peep-proof effect.

It is noteworthy that all of the prism sheets 221 and the diffusion sheet 222 shown in FIG. 2B can be applied to the backlight module 100 in the foregoing embodiment. Specifically, the backlight module 100 in FIG. 1B may further include the prism sheets 221 and the diffusion sheet 222 in FIG. 2B. In other words, the optical film 110 in FIG. 2B may be replaced by the optical film 110 in FIG. 1B. Therefore, both the backlight modules 100 and 200 can include the prism sheets 221 and the diffusion sheet 222.

Figure 4B:
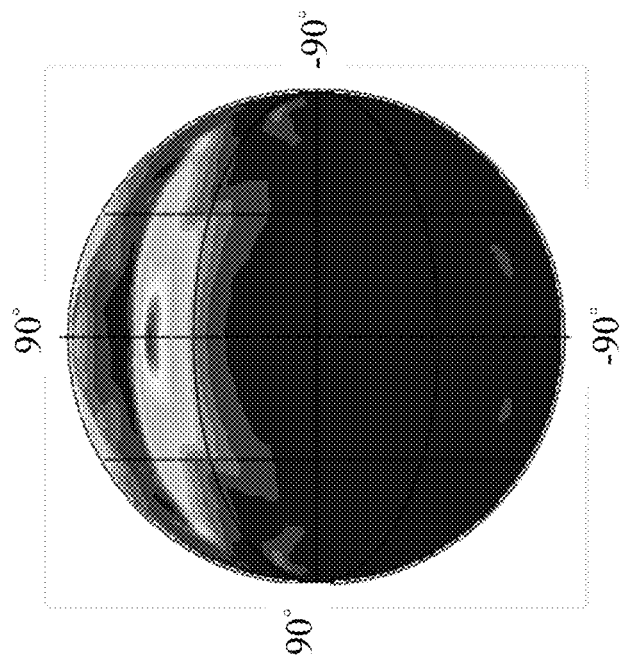
FIG. 4A and FIG. 4B are spatial luminance distribution diagrams of a backlight module of a comparative example and the backlight module shown in FIG. 1B respectively.
Figure 4A:
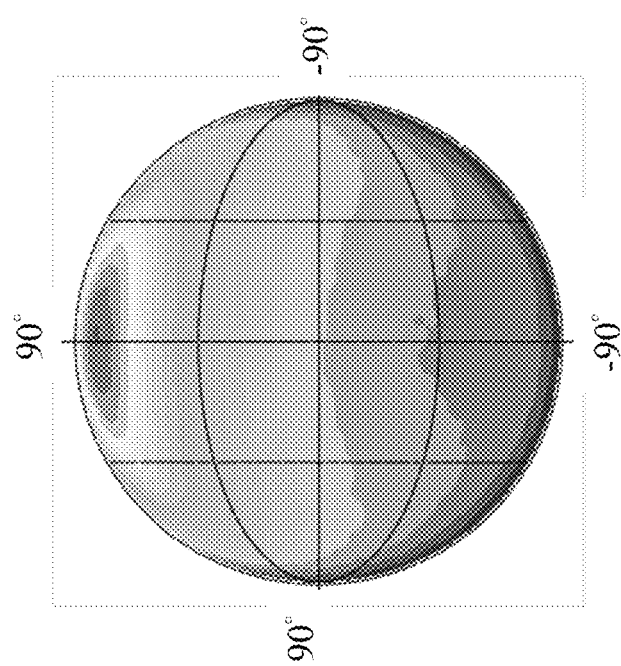

FIG. 4A and FIG. 4B are spatial luminance distribution diagrams of a backlight module of a comparative example and the backlight module shown in FIG. 1B respectively. It should be noted that the spatial luminance distribution diagrams (i.e., FIG. 4A, FIG. 4B, and FIG. 5A through FIG. 5E) are originally color diagrams. In the present application, the spatial luminance distribution diagrams are presented as gray scale diagrams. In addition, the spatial luminance distribution diagrams shown in FIG. 4A, FIG. 4B, and FIG. 5A through FIG. 5E are all computer simulation diagrams.

Referring to FIG. 4A and FIG. 4B, FIG. 4A represents the backlight module of the comparative example, which includes the light source, the light guide plate, and the conventional diffusion sheet containing scattering particles, but does not include any prism sheet. FIG. 4B represents the backlight module 100 shown in FIG. 1B, wherein the backlight module 100 represented by FIG. 4B does not include a prism sheet 221. In addition, the light source and the light guide plate included in the backlight module of the comparative example can be respectively the same as the light source 190 and the light guide plate 130, as shown in FIG. 1B.

In FIG. 4A and FIG. 4B, FIG. 4A and FIG. 4B are simulations which observe the luminance distributions by overlooking the backlight module of the comparative example and the backlight module 100, wherein both a vertical axis and a horizontal axis in FIG. 4A and FIG. 4B represent angles, and a center where the vertical axis and the horizontal axis intersect can represent a central axis of the light exiting surface of the light guide plate (such as the light exiting surface 132 of the light guide plate 130).

Referring to FIG. 1A, FIG. 1B, and FIG. 4B, the backlight module 100 is described as an example, the center where the vertical axis and the horizontal axis intersect in FIG. 4B corresponds to a central axis OB1 of the light exiting surface 132 in FIG. 1A. The vertical axis angle in FIG. 4B is equivalent to an observation angle SA1 shown in FIG. 1B. The observation angle SA1 is an included angle between the central axis OB1 and an observation direction OD1, and the absolute value of the observation angle SA1 is between 0 degree and 90 degrees. When the vertical axis angle in FIG. 4B is zero, it means that the included angle between the observation direction OD1 and the central axis OB1 is zero, that is, when the vertical axis angle is zero represents that the luminance of the backlight module 100 is observed from the central axis OB1.

When the vertical axis angle in FIG. 4B is a negative value, the observation direction OD1 is biased toward the light incident surface 131 of the light guide plate 130, that is, when the vertical axis angle is negative represents that the luminance of the backlight module 100 is observed from the side of the light exiting surface 132 adjacent to the light incident surface 131. Conversely, when the vertical axis angle in FIG. 4B is a positive value, the observation direction OD1 is away from the light incident surface 131 of the light guide plate 130, that is, the vertical axis angle is positive represents that the luminance of the backlight module 100 is observed from the side of the light exiting surface 132 away from the light incident surface 131, as the observation angle SA1 shown in FIG. 1B. Similarly, the luminance change on the horizontal axis in FIG. 4B represents the luminance distribution between the left side and right side of the backlight module 100 in FIG. 1A.

The viewing angle of the backlight module of the comparative example represented by FIG. 4A is about 61 degrees, and the viewing angle of the backlight module 100 represented by FIG. 4B is about 40 degrees, wherein the viewing angle is the angle of the peak of the light. In FIG. 4A, most of the areas have very light gray scales. In FIG. 4B, most of the areas have very dark gray scales, and only a specific small area has a lighter gray scale with the darkest gray scale inside. Thus, by using the optical film 110, the light directivity of the backlight module 100 is greater than that of the backlight module of the comparative example.

In addition, the full width at half maximum (FWHM) of the backlight module of the comparative example in FIG. 4A is about 69 degrees on the vertical axis, and about 40 degrees on the horizontal axis. The FWHM of the backlight module 100 in FIG. 4B is about 40 degrees on the vertical axis, and about 10 degrees on the horizontal axis. Therefore, the FWHM of the backlight module 100 in FIG. 4B is smaller than that of the backlight module of the comparative example in FIG. 4A, such that the light directivity of the backlight module 100 in FIG. 4B is greater than that of the backlight module of the comparative example in FIG. 4A, i.e., the backlight module 100 represented by FIG. 4B is more capable of concentrating or condensing the exiting light.

Figure 5B:
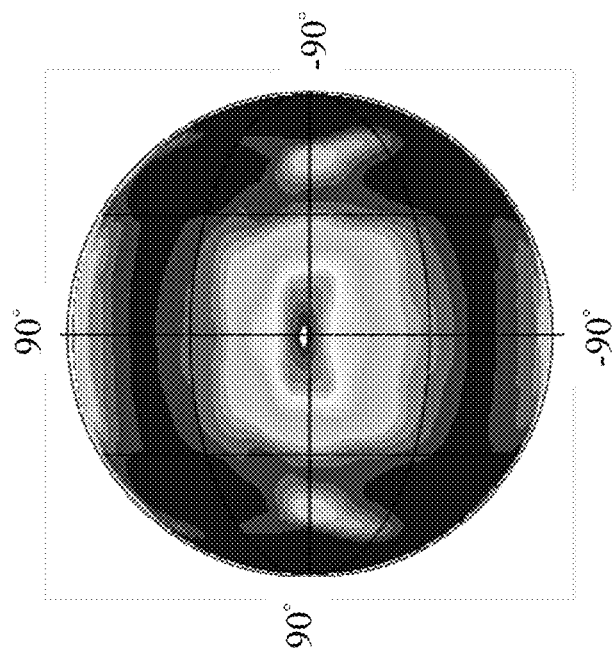
FIG. 5B through FIG. 5E are spatial luminance distribution diagrams of backlight modules of plural embodiments of the present invention.
Figure 5A:
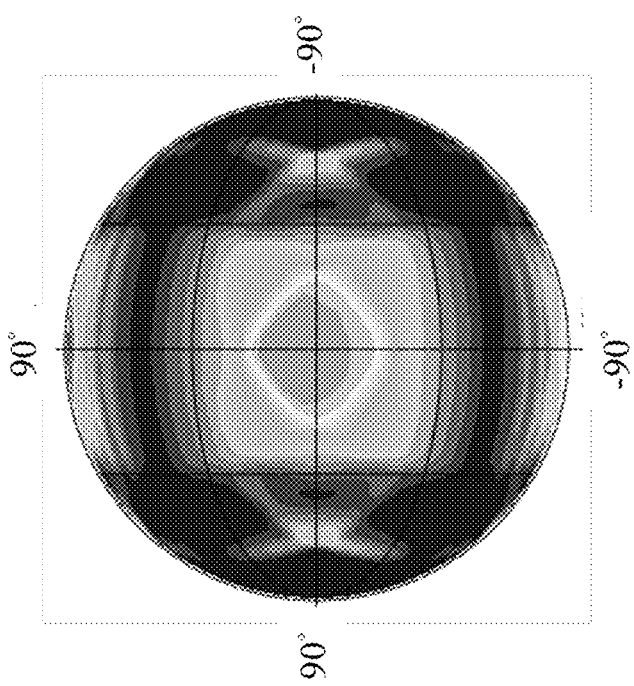
FIG. 5A is a spatial luminance distribution diagram of a backlight module of a comparative example.

FIG. 5A is a spatial luminance distribution diagram of a backlight module of a comparative example, and FIG. 5B through FIG. 5E are spatial luminance distribution diagrams of backlight modules of plural embodiments of the present invention, wherein the definitions of the vertical axis and the horizontal axis in FIG. 5A through FIG. 5E are all the same as those in FIG. 4A and FIG. 4B, and are not repeated here.

Referring to FIG. 5A and FIG. 5B, in addition to a light guide plate and a diffusion sheet, the backlight module of the comparative example represented by FIG. 5A further includes two prism sheets, but no optical film 110. FIG. 5B represents the backlight module 100 equipped with an optical film 110, two prism sheets (i.e., the prism sheets 221), and a diffusion sheet 222, wherein the settings of the two prism sheets are respectively as shown in FIG. 2B, FIG. 2D, and FIG. 2E. That is, the extending directions of the prism lenticulars of one of the prism sheets and the prisms 111 of the optical film 110 (both are the extending direction E1) are parallel to each other, and the extending directions of the prism lenticulars of the other one of the prism sheets and the prisms 111 (the extending directions E1 and E2 respectively) are perpendicular to each other.

The prism sheets (such as the prism sheets 221) can guide the light, such that most of the light from the backlight module can exit along the normal (such as the normal N1 in FIG. 1B). Therefore, the viewing angles of the backlight modules in both FIG. 5A and FIG. 5B are about 0 degrees. In addition, the FWHM of the luminance of the backlight module of the comparative example in FIG. 5A is about 45 degrees on the vertical axis and the horizontal axis. The FWMH of the luminance of the backlight module in FIG. 5B is about 38 degrees on the vertical axis, and about 31 degrees on the horizontal axis. Accordingly, the backlight module in FIG. 5B is more capable of concentrating or condensing the exiting light, and has greater light directivity than the backlight module of the comparative example in FIG. 5A, and the luminance can be increased by about 15%. In such configuration, when the optical film 110 shown in FIG. 1D, which are arranged obliquely in an array relative to one side of the optical film 110, is used together with the optical film 110 in FIG. 2A in which the prisms 111 extend along the extending direction E2, compared with the embodiment of the optical film 110 in FIG. 1A in which the prisms 111 extend along the extending direction E1, the energy of FWHM can be more concentrated, and the luminance can be further increased.

Figure 5C:
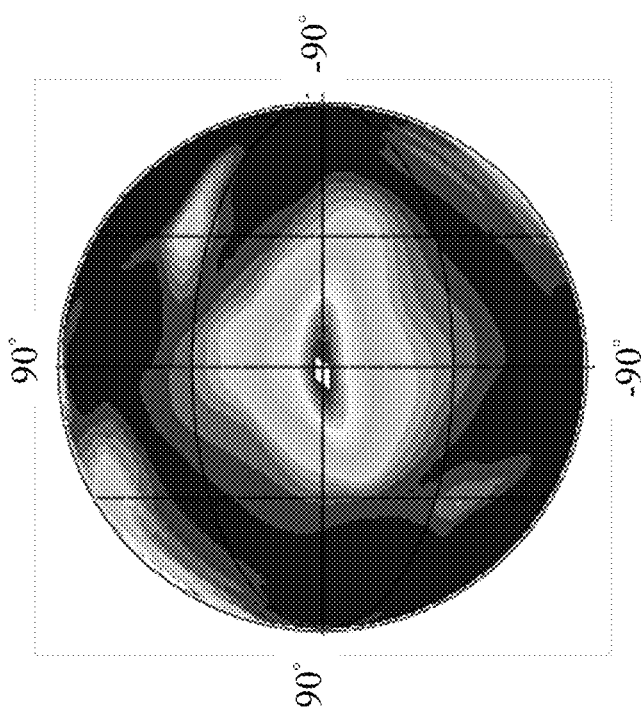

FIG. 5C is a spatial luminance distribution diagram of the backlight module of another embodiment shown in FIG. 3A and FIG. 3B of the present invention. Referring to FIG. 5C, FIG. 5C also represents the backlight module 100 after adding an optical film 110, two prism sheets (i.e., the prism sheets 221) and a diffusion sheet 222. However, the backlight module represented by FIG. 5C is different from that of FIG. 5B in that the arrangements of the two prism sheets are as shown in FIG. 3A and FIG. 3B respectively, that is, the extending directions of the prism lenticulars of the two prism sheets are neither parallel nor perpendicular to the extending direction E1 of the prisms 111 of the optical film 110. As shown in FIG. 3A and FIG. 3B, the orientation of the prism lenticulars of one of the prism sheets is in the direction of 45 degrees, and the orientation of the prism lenticulars of the other one of the prism sheets is in the direction of 135 degrees.

In the embodiment shown in FIG. 5C, the prism sheets (such as the prism sheets 221) can guide the light to exit along the normal line (such as the normal line N1 in FIG. 1B), such that the viewing angle of the backlight module in FIG. 5C is about 0 degree. In addition, the FWHM of the luminance of the backlight module in FIG. 5C is about 34 degrees on the vertical axis, and about 30 degrees on the horizontal axis. Therefore, compared with the backlight module of the comparative example in FIG. 5A, the backlight module in FIG. 5C is more capable of concentrating or condensing the exiting light and has better light directivity, and the luminance can be increased by about 20%.

Figure 5E:
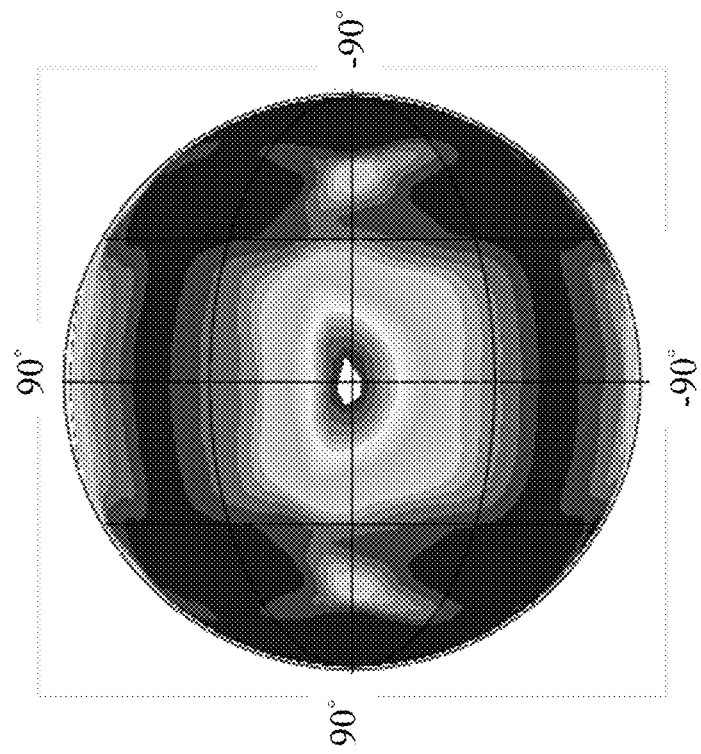
Figure 5D:
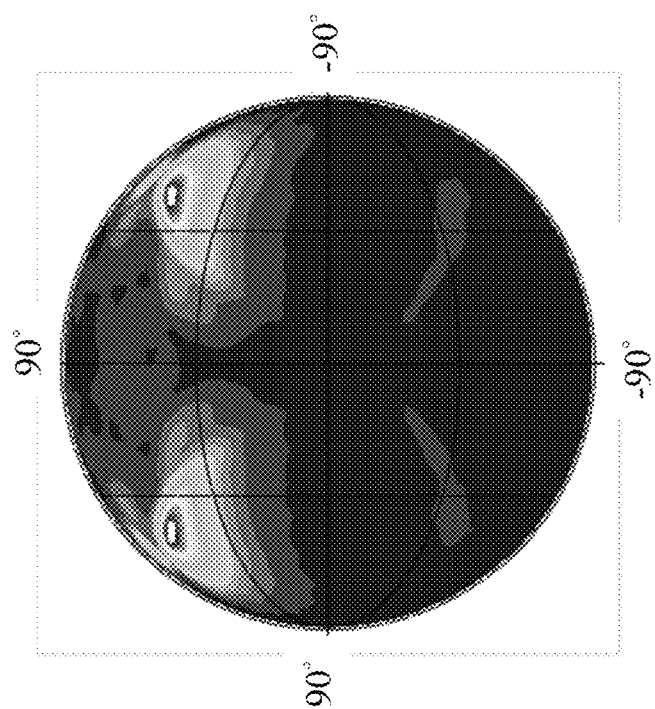

FIG. 5D and FIG. 5E are spatial luminance distribution diagrams of backlight modules in accordance with another embodiment of the present invention, wherein FIG. 5D and FIG. 5E both represent the backlight module 200 shown in FIG. 2A and FIG. 2B, that is, the prisms 111 of the optical film 110 extend along the extending direction E2. However, the backlight module 200 represented by FIG. 5D is equipped with an optical film 110, but does not include prism sheets 221 and a diffusion sheet 222. FIG. 5E represents the complete backlight module 200, and the orientation of the prism lenticulars of one of the prism sheets is in the direction of 0 degrees, and the orientation of the prism lenticulars of the other one of the prism sheets is in the direction of 90 degrees, as shown in FIG. 2A. The viewing angle of the backlight module 200 in FIG. 5D is about 52 degrees, and the FWHM of the luminance on the vertical axis is about 24 degrees, and the FWHM of the luminance on the horizontal axis is about 20 degrees. Therefore, compared with the backlight module of the comparative example in FIG. 4A, the backlight module 200 represented by FIG. 5D has better light directivity under the condition that there is no prism sheet (i.e., the prism sheet 221) and the diffusion sheet 222, a light-splitting effect has been generated, such that the left viewing angle and the right viewing angle (the light areas on both sides, and the dark portion and the white portion in the light areas) can have sufficient luminance.

In FIG. 5E, through using the prism sheets 221 (i.e., the prism sheets) to guide the light, the viewing angle of the backlight module 200 (including the prism sheets 221 and the diffusion sheet 222) is about 0 degree. In addition, the FWMH of the luminance of the backlight module 200 represented by FIG. 5E is about 34 degrees on the vertical axis, and about 27 degrees on the horizontal axis. Compared with the comparative example in FIG. 5A, the backlight module 200 in FIG. 5E has good light directivity, and the original light splitting effect in FIG. 5D is concentrated to the normal viewing angle (the light area in the middle, and the dark portion and the white portion in the light area), as shown in FIG. 5E, and the luminance can be increased by about 20%.

Figure 6:
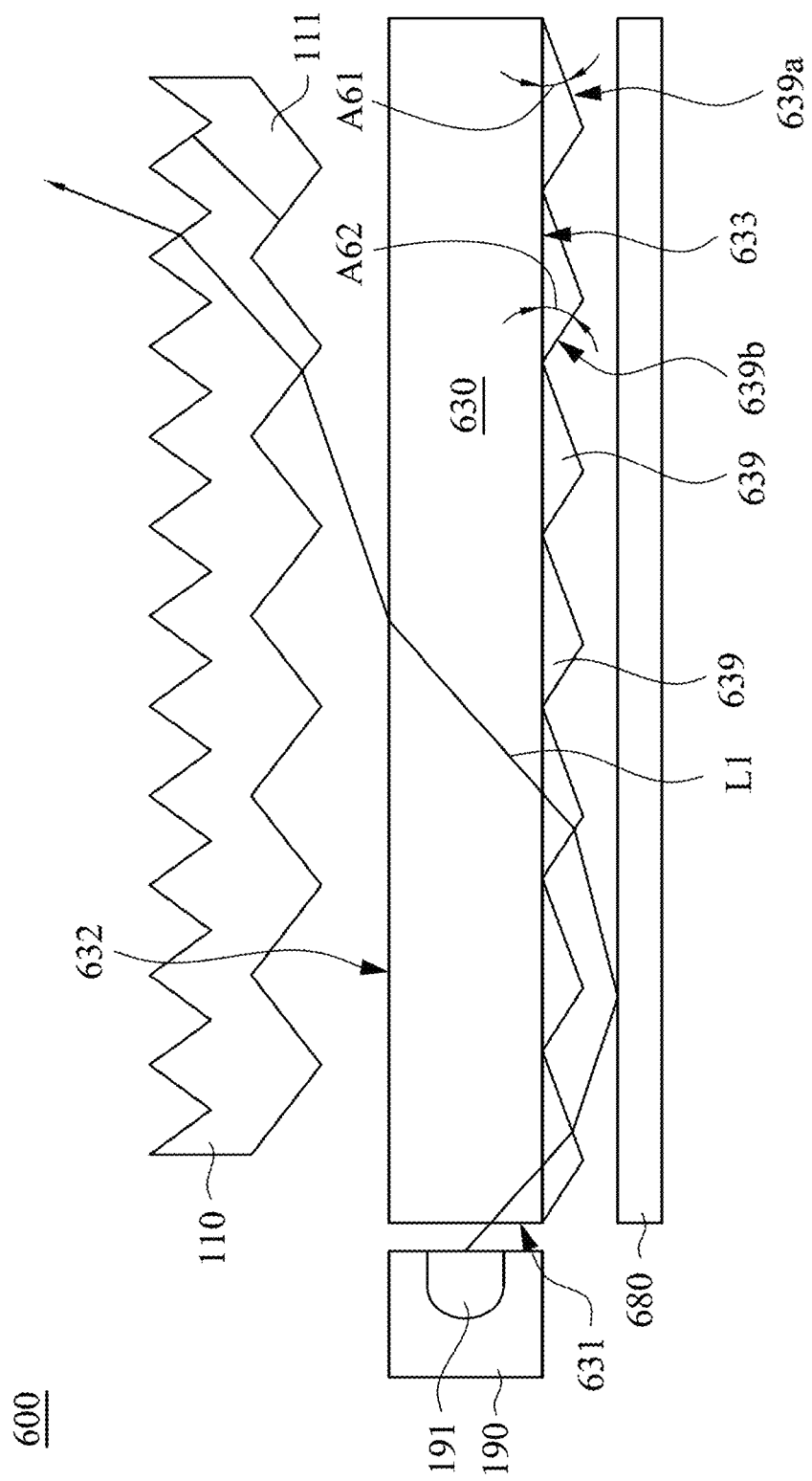
FIG. 6 is a schematic cross-sectional view of a backlight module in accordance with another embodiment of the present invention.

FIG. 6 is a schematic cross-sectional view of a backlight module in accordance with another embodiment of the present invention. Referring to FIG. 6, a backlight module 600 of the present embodiment is similar to the backlight module 100 of the previous embodiment, and a difference between the backlight modules 600 and 100 is that a light guide plate 630 included in the backlight module 600 is different from the light guide plate 130 in the previous embodiment. The following mainly describes the differences between the backlight modules 600 and 100, and the same features of the backlight modules 600 and 100 are basically not repeated.

Specifically, the light guide plate 630 has a bottom surface 633 and plural light guide structures 639 formed on the bottom surface 633, wherein each of the light guide structures 639 has a light facing surface 639a and a non-light facing surface 639b connected to each other, and the light facing surface 639a faces a traveling direction of the light L1 of the light source 190. A first included angle A61 is formed between the light facing surface 639a and the bottom surface 633, and a second included angle A62 is formed between the non-light facing surface 639b and the bottom surface 633, wherein both the first included angle A61 and the second included angle A62 are acute angles, and the first included angle A61 is smaller than the second included angle A62, as shown in FIG. 6.

When the light source 190 emits light L1 toward a light incident surface 631 of the light guide plate 630, the light L1 enters the light guide plate 630 from the light incident surface 631, wherein some light L1 is travelled to the light guide structure 639, for example, to the light facing surface 639a. The light L1 can be reflected by the light guide structure 639 (such as the light facing surface 639a), such that the light L1 can exit from a light exiting surface 632 of the light guide plate 630. With such design, the area of the light facing surface 639a can be enlarged, and the area of the non-light facing surface 639b can be reduced, such that the light facing surface 639a can have a larger probability of reflecting the light and emitting the light from the light exiting surface 632 of the light guide plate 630 for use by the optical film 110, which is beneficial to enhance directivity.

The backlight module 600 may further include a reflective sheet 680, wherein the reflective sheet 680 is located under the light guide plate 630 and faces the bottom surface 633, and the light guide plate 630 is located between the reflective sheet 680 and the optical film 110. When the light L1 is travelled to the light guide structure 639, the light guide structure 639 can not only reflect the light L1, but also refract the light L1, as shown in FIG. 6. When the light L1 is refracted by the light guide structure 639, the light L1 will travel to the reflective sheet 680. The reflective sheet 680 can reflect the light L1, such that the light L1 can enter the light guide plate 630 again, and more light L1 can exit from the light exiting surface 632. Accordingly, the luminance of the backlight module 600 is increased.

It is noteworthy that the backlight module 600 in FIG. 6 may further include plural prism sheets 221 and a diffusion sheet 222 (as shown in FIG. 2B), or include plural prism sheets 321a and 321b (as shown in FIG. 3A and FIG. 3B). In other words, in the backlight module 200 shown in FIG. 2B, the light guide plate 130 may be replaced with the light guide plate 630 shown in FIG. 6. In addition, the optical film 110 in FIG. 6 may also be replaced with the optical film 110 in FIG. 2B. That is, in FIG. 6, the prisms 111 of the optical film 110 may extend along the extending direction E1 or E2.

Figure 7:
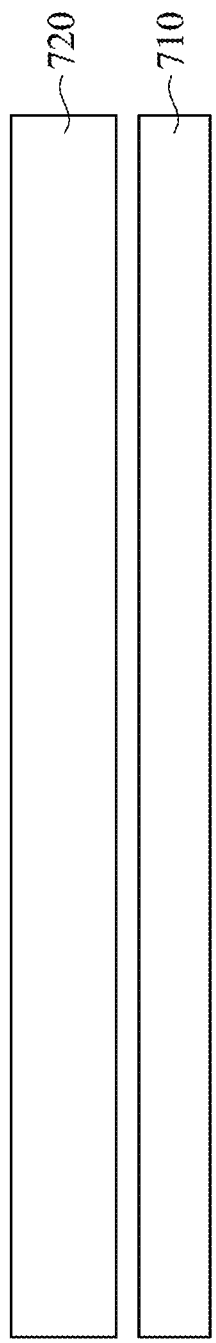
FIG. 7 is a schematic side view of a display device in accordance with one embodiment of the present invention.

FIG. 7 is a schematic side view of a display device in accordance with one embodiment of the present invention. Referring to FIG. 7, a display device includes a backlight module 710 and a display panel 720, wherein the display panel 720 is disposed relative to the backlight module 710 and located above a light exiting surface of the backlight module 710, such that the backlight module 710 can emit light toward the display panel 720.

The backlight module 710 may be the backlight module 100, 200 or 600 in the foregoing embodiments, or any combination of the backlight modules 100, 200 and 600, for example, the backlight module 100 including plural prism sheets 221 and a diffusion sheet 222. Therefore, the backlight module 710 includes the optical film 110. The display panel 720 may be a transmissive display panel, such as a liquid crystal display panel. The optical film 110 can concentrate or condense the exiting light L1 to increase light directivity of the backlight module 710 while maintaining the ability of flaw-concealing, such that the backlight module 710 can uniformly emit light of high luminance to enhance the light concentration at the light-exiting viewing angle and the luminance at the normal viewing angle, and has a flaw-concealing effect, thereby improving the brightness and the uniformity of the display panel 720.

Figure 8:
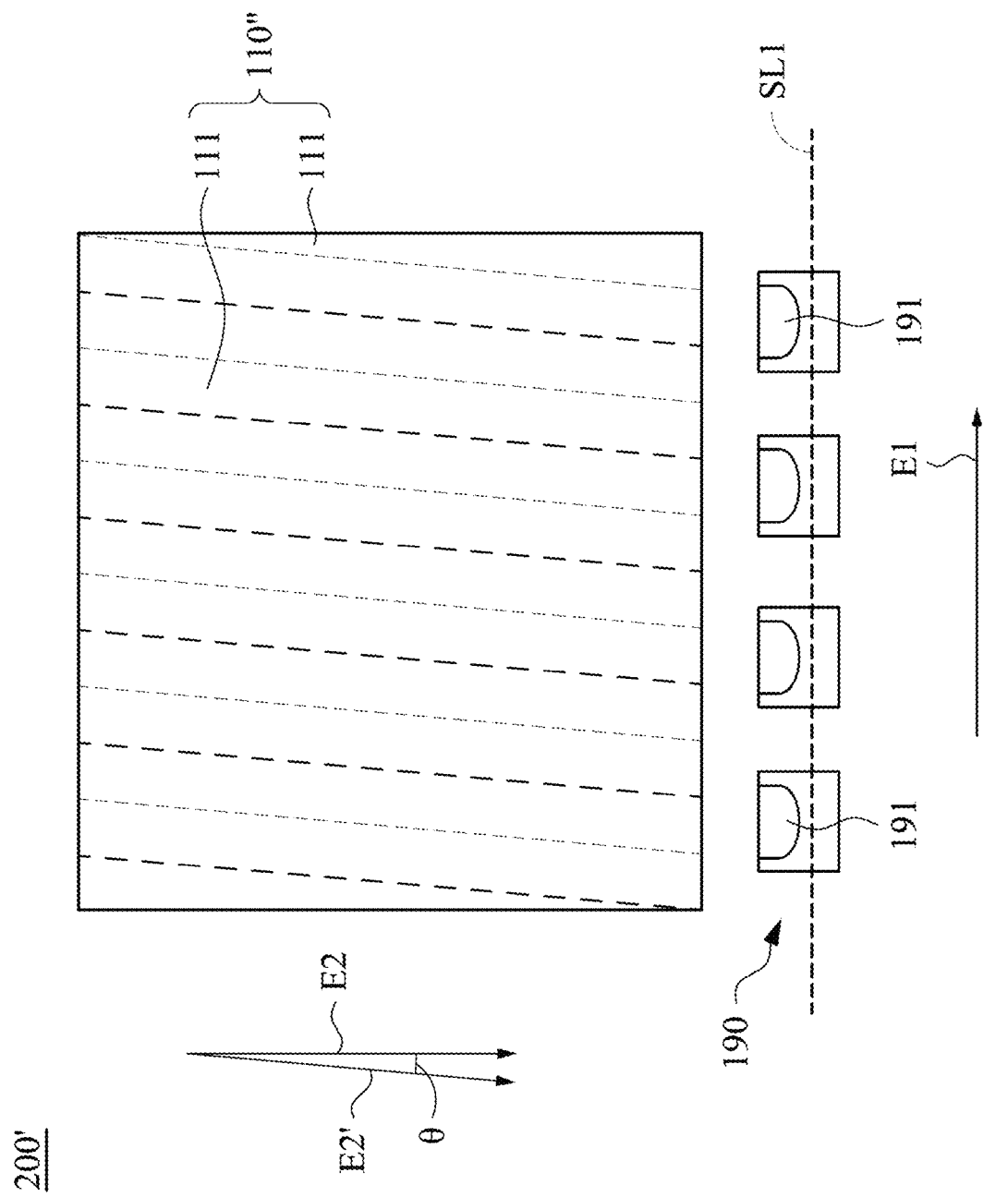
FIG. 8 is the schematic top view of a backlight module in accordance with another embodiment of the present invention.

FIG. 8 is the schematic top view of a backlight module in accordance with another embodiment of the present invention. In the embodiment shown in FIG. 8, the backlight module 200' may include the prism sheets 221 and the diffusion sheet 222 shown in FIG. 2B, and an optical film 110". Similarly, the optical film 110" includes plural prisms 111 and plural microstructures 112. In order to clearly show an extending direction E2' of the prisms 111, FIG. 8 omits the prism sheets 221, the diffusion sheet 222, and the microstructures 112.

The extending direction E2' of the prisms 111 is oriented substantially non-parallel to the arranged direction of the light-emitting diodes 191. In addition, the extending direction E2' of the prisms 111 is oriented substantially along the extending direction E2 of the prism lenticulars 221s of one of the prism sheets 221. Specifically, the extending direction E2' of the prisms 111 is oriented at a desired angle θ with respect to the extending direction E2 of the prism lenticulars 221s of one of the prism sheets 221. In some examples, the desired angle θ is non-zero and less than ten degrees from the extending direction E2 of the prism lenticulars 221s of one of the prism sheets 221.

The interaction of strip structures of different arrangements will produce a Moiré pattern. The Moiré pattern is a visual effect of magnification or reduction produced by the overlapping, rotating, etc. of two or more different groups of stripes. The principle of the Moiré pattern is that two groups of patterns with similar spatial frequencies interfere with each other to display a pattern with a lower frequency (wider spacing). The present embodiment slightly rotates the prisms 111 to orient the extending direction E2' of the prisms 111 at the desired angle θ with respect to the extending direction E2 of the prism lenticulars 221s of one of the prism sheets 221. Accordingly, the original interference rule between the prisms 111 of the optical film 110 and the prism lenticulars 221s of one of the prism sheets 221 can be destroyed to decrease the Moiré pattern effect.

Figure 9:
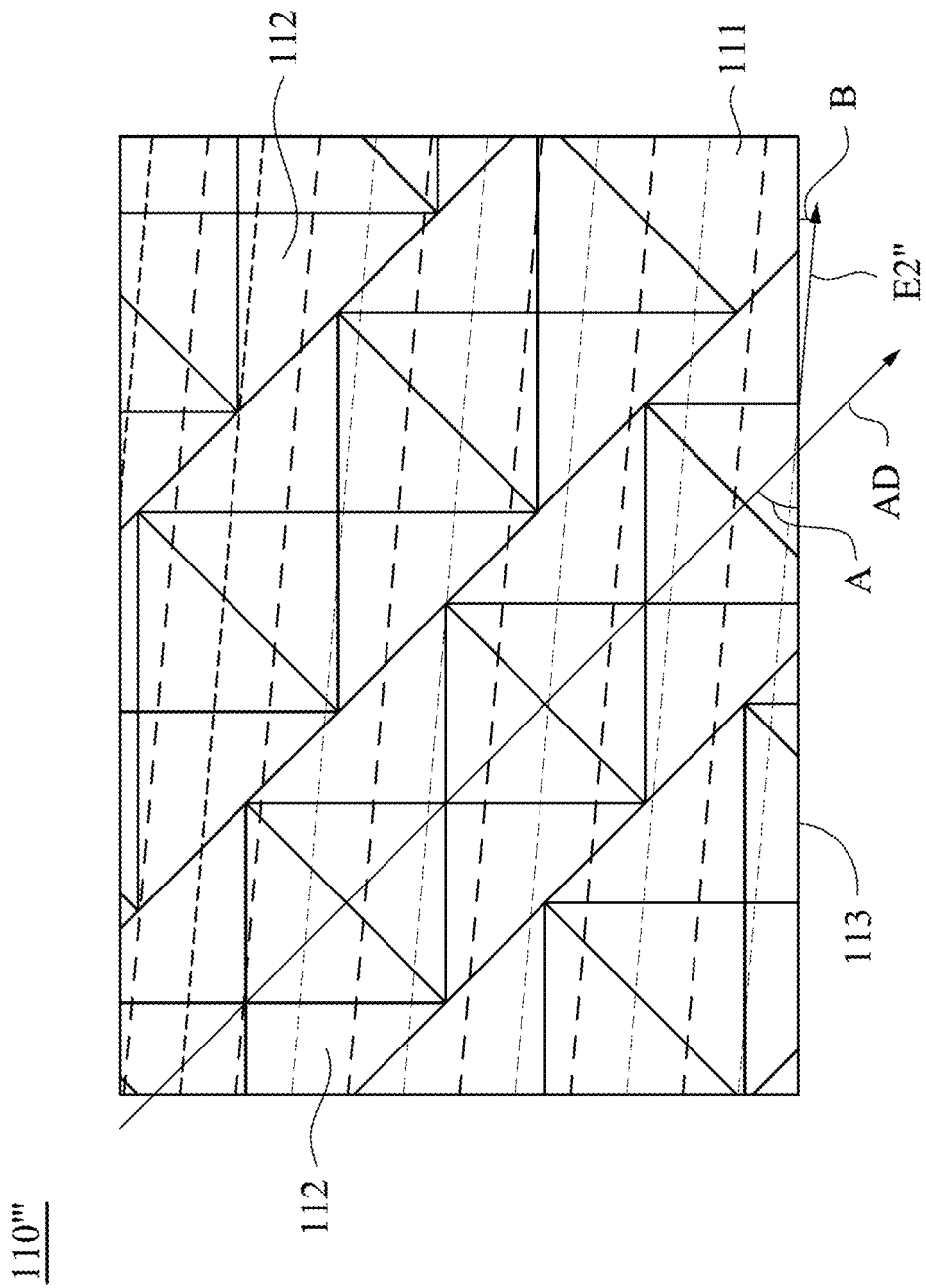
FIG. 9 is a schematic partial top view of an optical film in accordance with another embodiment of the present invention.

FIG. 9 is a schematic partial top view of an optical film in accordance with another embodiment of the present invention. A structure of an optical film 110''' is similar to that of the optical film 110' shown in FIG. 1D, and a difference between the optical film 110''' and the optical film 110' is that an extending direction of prisms 111 of the optical film 110''' is oriented substantially non-parallel to any sides of the optical film 110'''.

Specifically, the optical film 110''' includes plural prisms 111 and plural microstructures 112, which are on two opposite sides of the optical film 110'''. Each of the microstructures 112 is a pyramid structure with plural facets 112s. For example, the microstructures 112 may be pyramid concaves or pyramid bumps, which are adjacent to each other. At least some of the microstructures have a common pyramid apex direction AD. In addition, the microstructures 112 are arranged obliquely in an array relative to one side 113 of the optical film 110''', so that the common pyramid apex direction AD is oriented at a desired angle A with respect to the side 113 of the optical film 110'''. An extending direction E2" of the prisms 111 is oriented at a desired angle B with respect to the side 113 of the optical film 110'''. In some examples, the desired angle A is larger than the desired angle B. For example, the desired angle A may be forty-five degrees, and the desired angle B is non-zero and may be less than ten degrees from the side 113 of the optical film 110'''.

In the present embodiment, the prisms 111 are slightly rotated, and the array of the microstructures 112 is rotated by a larger angle than the prisms 111, such that the Moiré pattern effect can be reduced more effectively.

Although the present invention has been disclosed above with embodiments, it is not intended to limit the present invention. Any person having ordinary skill in the art can make various changes and modifications without departing from the spirit and scope of the present disclosure. Therefore, the protection scope of the present invention should be defined by the scope of the appended claims.

What is claimed is:

1. A backlight module, comprising:
a light guide plate having a light incident surface and a light exiting surface opposite to the light incident surface, wherein the light exiting surface has a normal line;
a plurality of prism sheets, wherein each of the prism sheets includes plural parallel prism lenticulars;
a light source adjacent to the light incident surface, wherein the light source has a plurality of light-emitting diodes; and
an optical film located between the prism sheets and the light exiting surface and comprising:
a plurality of parallel prisms, wherein an extending direction of each of the prisms is perpendicular to the normal line, and each of the prisms faces the light exiting surface of the light guide plate; and
a plurality of microstructures, and each of the microstructures being located on a surface of the optical film which faces away from the light guide plate, wherein each of the microstructures has a pyramid structure with a plurality of facets, and the prisms are located between the microstructures and the light exiting surface;
wherein the light exiting surface is connected to one side of the light incident surface; and
wherein the extending direction of the prisms is oriented non-parallel to an arranged direction of the light-emitting diodes and oriented along an extending direction of the prism lenticulars of one of the prism sheets;
wherein the light-emitting diodes are arranged along a straight line, wherein an extending direction of the prism lenticulars of each of the prism sheets is neither parallel nor perpendicular to the straight line.

2. The backlight module of claim 1, wherein the extending direction of the prism lenticulars of one of the prism sheets is oriented substantially perpendicular to an extending direction of the prism lenticulars of another one of the prism sheets, and the extending direction of the prisms of the optical film is oriented at a desired angle with respect to the extending direction of the prism lenticulars of one of the prism sheets.

3. The backlight module of claim 2, wherein the desired angle is non-zero and less than ten degrees from the extending direction of the prism lenticulars of one of the prism sheets.

4. The backlight module of claim 1, wherein the microstructures are a plurality of pyramid concaves adjacent to each other.

5. The backlight module of claim 1, wherein the microstructures are pyramid bumps adjacent to each other.

6. The backlight module of claim 1, wherein at least some of plurality of the microstructures have a common pyramid apex direction, the microstructures are arranged obliquely in an array so that the common pyramid apex direction is oriented at a desired angle A with respect to one side of the optical film, the extending direction of the prisms of the optical film is oriented at a desired angle B with respect to the side of the optical film, and the desired angle A is larger than the desired angle B.

7. The backlight module of claim 6, wherein the desired angle A is forty-five degrees, and the desired angle B is non-zero and less than ten degrees from the side of the optical film.

8. The backlight module of claim 1, wherein the light guide plate has a bottom surface opposite to the light exiting surface and a plurality of light guide structures formed on the bottom surface, wherein each of the light guide structures has a light facing surface and a non-light facing surface connected to each other, the light facing surface faces a light traveling direction of the light source, a first included angle is formed between the light facing surface and the bottom surface, a second included angle is formed between the non-light facing surface and the bottom surface, both the first included angle and the second included angle are acute angles, and the first included angle is smaller than the second included angle.

9. A display device, comprising:
a backlight module as claimed in claim 1; and
a display panel disposed to the backlight module.

* * * * *